United States Patent
Tanavde et al.

(10) Patent No.: US 9,450,466 B2
(45) Date of Patent: Sep. 20, 2016

(54) STATOR CORE SUPPORT SYSTEM

(71) Applicant: General Electric Company, Schenectady, NY (US)

(72) Inventors: Anand Shankar Tanavde, Slingerlands, NY (US); William Edward Adis, Scotia, NY (US); David Robert Schumacher, Scotia, NY (US); David Raju Yamarthi, Bangalore (IN)

(73) Assignee: General Electric Company, Schenectady, NY (US)

( * ) Notice: Subject to any disclaimer, the term of this patent is extended or adjusted under 35 U.S.C. 154(b) by 511 days.

(21) Appl. No.: 13/934,192

(22) Filed: Jul. 2, 2013

(65) Prior Publication Data

US 2015/0008781 A1     Jan. 8, 2015

(51) Int. Cl.
*H02K 5/00* (2006.01)
*H02K 1/18* (2006.01)

(52) U.S. Cl.
CPC ............... *H02K 5/00* (2013.01); *H02K 1/185* (2013.01)

(58) Field of Classification Search
CPC ............ H02K 1/06; H02K 1/18; H02K 5/00; H02K 5/24; H02K 15/14
USPC ..................................... 310/51, 91
See application file for complete search history.

(56) References Cited

U.S. PATENT DOCUMENTS

| | | |
|---|---|---|
| 681,800 A | 9/1901 | Lasche |
| 2,199,141 A | 4/1940 | Rice |
| 2,199,156 A | 4/1940 | Grobel |
| 2,199,351 A | 4/1940 | Taylor |
| 2,424,299 A | 7/1947 | Baudry et al. |
| 2,489,109 A | 11/1949 | Shildneck et al. |
| 2,554,226 A | 5/1951 | Taylor |
| 2,561,994 A | 7/1951 | Rashevsky et al. |
| 2,811,658 A | 10/1957 | Brainard |
| 2,811,659 A | 10/1957 | Barlow et al. |
| 2,846,603 A | 8/1958 | Webster et al. |

(Continued)

FOREIGN PATENT DOCUMENTS

| | | |
|---|---|---|
| GB | 1162998 | 9/1969 |
| GB | 2470466 A | 11/2010 |

(Continued)

OTHER PUBLICATIONS

U.S. Appl. No. 12/915,535, Notice of Allowance and Fees due dated Dec. 18, 2013.

(Continued)

*Primary Examiner* — Tran Nguyen
(74) *Attorney, Agent, or Firm* — Ernest G. Cusick; Hoffman Warnick LLC

(57) ABSTRACT

Embodiments of the invention are related generally to electromagnetic machines and, more particularly, to a suspension system and related methods for the attachment of the stator core of an electromagnetic machine to a surrounding frame or enclosure. In one embodiment, the invention provides a system for supporting a stator core of an electromagnetic machine, the system comprising: a rigid frame structure including: an upper portion; and a lower portion beneath the upper portion; a first plurality of wire rope members, each having a first end and a second end; and a first plurality of attachment devices for affixing at least one of the first end or the second end of each of the first plurality of wire rope members to the upper portion.

10 Claims, 5 Drawing Sheets

(56) References Cited

U.S. PATENT DOCUMENTS

| | | | |
|---|---|---|---|
| 3,462,624 A | 8/1969 | Darrieus | |
| 3,531,667 A | 9/1970 | Barton et al. | |
| 3,652,889 A | 3/1972 | Reece et al. | |
| 3,708,707 A | 1/1973 | Kranz | |
| 3,988,622 A | 10/1976 | Starcevic | |
| 4,110,652 A | 8/1978 | McGahern | |
| 4,204,313 A | 5/1980 | Khutoretsky et al. | |
| 4,425,523 A | 1/1984 | Detinko et al. | |
| 4,469,973 A | 9/1984 | Guyot et al. | |
| 4,536,671 A | 8/1985 | Miller | |
| 4,634,909 A | 1/1987 | Brem | |
| 4,663,553 A | 5/1987 | Zimmermann | |
| 4,891,540 A | 1/1990 | Cooper et al. | |
| 4,894,573 A | 1/1990 | Simpson | |
| 5,796,191 A | 8/1998 | Schwanda | |
| 5,875,540 A | 3/1999 | Sargeant et al. | |
| 6,104,116 A | 8/2000 | Fuller et al. | |
| 6,144,129 A | 11/2000 | Fuller et al. | |
| 6,321,439 B1 | 11/2001 | Berrong et al. | |
| 6,346,760 B1* | 2/2002 | Boardman, IV | H02K 1/185 310/216.007 |
| 6,498,417 B2 | 12/2002 | Fuller | |
| 6,628,027 B2 | 9/2003 | Fuller | |
| 6,720,699 B1 | 4/2004 | Shah et al. | |
| 6,775,900 B2 | 8/2004 | Dawson et al. | |
| 7,202,587 B2 | 4/2007 | Sargeant et al. | |
| 7,302,754 B2 | 12/2007 | Majernik et al. | |
| 7,353,586 B2 | 4/2008 | Majernik et al. | |
| 7,397,163 B2 | 7/2008 | Cook et al. | |
| 7,714,477 B2 | 5/2010 | Nagashima et al. | |
| 7,827,676 B2 | 11/2010 | Allen et al. | |
| 7,923,890 B2 | 4/2011 | Boardman, IV et al. | |
| 7,923,891 B2 | 4/2011 | Kikuichi | |
| 7,946,028 B2 | 5/2011 | Majernik et al. | |
| 8,040,014 B2 | 10/2011 | Boardman, IV et al. | |
| 8,138,654 B2 | 3/2012 | Boardman, IV | |
| 8,258,680 B2 | 9/2012 | Tanavde et al. | |
| 8,319,405 B2 | 11/2012 | Allen et al. | |
| 8,941,282 B2 | 1/2015 | Allen et al. | |
| 2002/0135244 A1* | 9/2002 | Strong | H02K 1/185 310/51 |
| 2011/0109187 A1* | 5/2011 | Tanavde | H02K 1/185 310/214 |
| 2011/0210643 A1 | 9/2011 | Tanavde et al. | |
| 2012/0043861 A1 | 2/2012 | Allen et al. | |
| 2012/0104760 A1 | 5/2012 | Tanavde et al. | |
| 2014/0015356 A1* | 1/2014 | Chamberlin | H02K 1/18 310/64 |

FOREIGN PATENT DOCUMENTS

| | | |
|---|---|---|
| GB | 2470467 A | 11/2010 |
| GB | 2740466 A | 11/2010 |
| GB | 2475599 A | 5/2011 |
| GB | 2478191 | 8/2011 |
| JP | S54162107 A | 12/1979 |
| JP | 55086348 A | 6/1980 |
| JP | 61049629 A | 3/1986 |
| JP | S61244238 A | 10/1986 |
| JP | 62260538 A | 11/1987 |
| JP | 2007166726 A | 6/2007 |
| WO | 0057535 A1 | 9/2000 |

OTHER PUBLICATIONS

DYWIDAG-Systems International, "DYWIDAG Post-Tensioning Systems; Multistrand Systems; Bar Systems; Repair and Strengthening," Apr. 2006, 31 pages, retrieved from: http://www.dsiamerica.com/uploads/media/DSI-USA__Bonded-Post-Tensioning-Systems_us_01.pdf.

AMSYSCO, "Material Properties of Post-Tension Strands," Jan. 2010, 3 pages, retrieved from: http://www.amsyscoinc.com/2010/01/29/material-properties-of-post-tension-strands/.

Post-Tensioning Institute, "What is Post-Tensioning?," Dec. 2000, 2 pages, retrieved from: http://www.dsiamerica.com/uploads/media/DSI-USA__What_is_Post-Tensioning_us_02.pdf.

VSL, "VSL Post-Tensioning Technology," 2013, 10 pages, retrieved from: http://www.vsl.com/index.php?option=com_content&task=blogcategory&id=17&itemid=86.

Tensioning Materials for Prestressed Concrete, "Ultra-high Strength Prestressing Strand," 1 page, retrieved from: http://www.sei-ssw.co.jp/en/pdf/prestressed_concrete_catalog_05.pdf.

Sumitomo Electric, "Super-High_Tension Prestressed Concrete Strand 15.7 mm in Diameter," 2013, 2 pages, Newsletter "SEI News," vol. 414, retrieved from: http://global-sei.com/sn/2012/414/3a.html.

Legendre, Notice of Allowance and Fee(s) Due for U.S. Appl. No. 12/915,535, dated Apr. 30, 2014, 13 pages.

Great Britain Intellectual Property Office, Search Report for Application No. GB1018954.6 dated Aug. 4, 2011, 3 pages.

Mullins, Office Action Communication for U.S. Appl. No. 12/622,751 dated Jan. 7, 2011, 11 pages.

Mullins, Office Action Communication for U.S. Appl. No. 12/622,751 dated May 20, 2011, 13 pages.

Mullins, Notice of Allowance and Fee(s) Due for U.S. Appl. No. 12/622,751 dated Jul. 18, 2011, 11 pages.

Legendre, Office Action Communication for U.S. Appl. No. 12/915,535 dated Sep. 18, 2013, 60 pages.

Great Britain Intellectual Property Office, Search Report for Application No. GB1103083.0 dated Jun. 24, 2011, 4 pages.

Andrews, Office Action Communication for U.S. Appl. No. 12/713,505 dated Jun. 21, 2011, 24 pages.

Great Britain Intellectual Property Office, Search Report for Application No. GB1018954.6 dated Mar. 9, 2011, 5 pages.

Great Britain Intellectual Property Office, Search Report Under Section 17 for Application No. GB1118413.2 dated Feb. 23, 2012, 1 page.

Legendre, Notice of Allowance and Fee(s) Due for U.S. Appl. No. 12/915,535 dated Apr. 30, 2014, 13 pages.

U.S. Appl. No. 14/089,742, Office Action 1 dated Mar. 29, 2016, 47 pages.

U.S. Appl. No. 13/934,189, Notice of Allowance dated Dec. 11, 2015, 30 pages.

\* cited by examiner

STATOR CORE SUPPORT SYSTEM

BACKGROUND OF THE INVENTION

Embodiments of the invention relate generally to electromagnetic machines and, more particularly, to a suspension system and related methods for the attachment of the stator core of an electromagnetic machine to a surrounding frame or enclosure.

Electromagnetic machines, such as electric power generators, include a stator core, typically made up of a plurality of stacked steel laminations. Vibrations originating from or transmitted to the stator core are currently reduced by connecting the stator core to a surrounding rigid frame using a plurality of spring bars—rigid metal bars that incorporate a flexible portion intended to absorb such vibrations.

BRIEF DESCRIPTION OF THE INVENTION

In one embodiment, the invention provides a system for supporting a stator core of an electromagnetic machine, the system comprising: a rigid frame structure including: an upper portion; and a lower portion beneath the upper portion; a first plurality of wire rope members, each having a first end and a second end; and a first plurality of attachment devices for affixing at least one of the first end or the second end of each of the first plurality of wire rope members to the upper portion.

In another embodiment, the invention provides an electromagnetic machine comprising: a stator core; a system for supporting the stator core, the system comprising: a rigid frame structure including: an upper portion; and a lower portion beneath the upper portion; a first plurality of wire rope members, each having a first end and a second end; and a first plurality of attachment devices for affixing at least one of the first end or the second end of each of the first plurality of wire rope members to the upper portion.

In still another embodiment, the invention provides a method of reducing vibration in a stator core of an electromagnetic machine, the method comprising: suspending the stator core from a suspension system including at least one wire rope member attached to a rigid frame structure.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
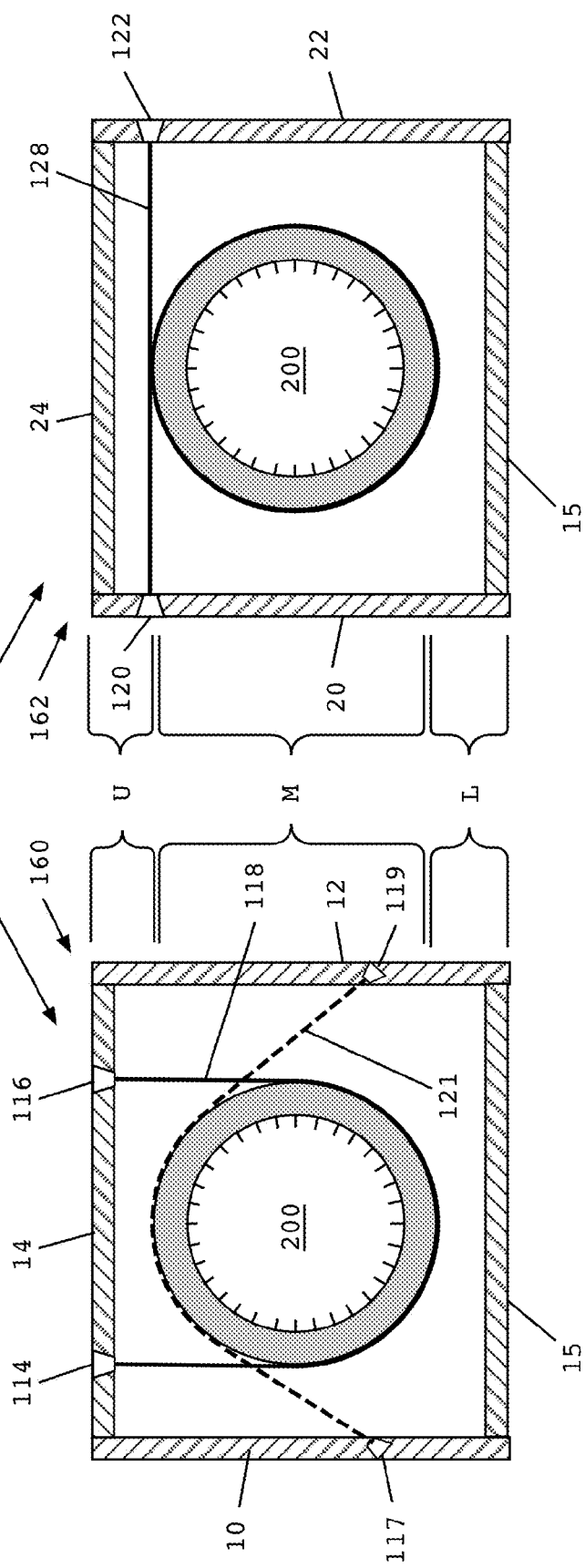
FIGS. 1-4 show schematic cross-sectional views of portions of a suspension system according to one embodiment of the invention, in conjunction with a stator core.

Turning now to the drawings, FIG. 1 shows a simplified cross-sectional view of a stator core 200 of an electromagnetic machine in conjunction with a suspension system 300 according to one embodiment of the invention. Suspension system 300 includes a first rigid frame structure 160 including a pair of vertical members 10, 12 and a pair of horizontal members 14, 15. First rigid frame structure 160 may be viewed as comprising an upper portion U situated above stator core 200, a lower portion L situated below stator core 200, and a middle portion M within which stator core 200 is situated.

A first vertical wire rope member 118 is affixed at each end to the horizontal member 14 of first rigid frame structure 160. First wire rope member 118 and other wire rope members described below may include any number of materials, including, for example, solid metal wires, twisted or braided metal wires, etc. In some embodiments of the invention, the wire rope members comprise wire rope made up of a plurality of braided metal strands surrounding a solid or braided metal core. Non-metal materials, such as polyethylenes and nylons, may also be employed in some embodiments of the invention. Other materials are possible, of course, and the term "wire rope member," as used herein, is intended to refer broadly to a flexible wire rope.

Either end of the first vertical wire rope member 118 is affixed to the horizontal member 14 by an attachment device 114, 116, the structure and function of which is described in greater detail below. First vertical wire rope member 118 extends downward from horizontal member 14 and beneath stator core 200, thereby supporting the weight of stator core 200.

While supporting the weight of stator core 200, first vertical wire rope member 118 serves to insulate first rigid frame structure 160 from vibrations originating from stator core 200. Due to the flexible nature of first vertical wire rope member 118, the degree of vibration isolation between first rigid frame structure 160 and stator core 200 is greater than possible using key bars in known devices. In addition, in some embodiments of the invention, such vibration isolation may be "tuned" or adjusted using multiple vertical wire rope members. In still other embodiments, one or more angled wire rope members 121 may be anchored to the rigid frame structure 160 at an angle. The pre-tension force in the wire rope members 118 and 121 may be adjusted for accurate alignment of an axis of the stator core 200 with an axis of the rotor (not shown). One skilled in the art will recognize that wire rope member 121 may be angled with respect to rigid frame structure 160 by angling attachment devices 117, 119 within rigid frame structure 160 and/or by angling wire rope member 121 with respect to attachment devices 117, 119.

As noted above, in addition to supporting the weight of stator core 200 and isolating vibrations between stator core 200 and first rigid frame structure 160, suspension system 300 may be employed to adjust a position of stator core 200 within rigid frame structures 160, 162, 164, 166 (FIGS. 1-5). For example, adjusting the length of first vertical wire rope member 118 within first rigid frame structure 160 (FIGS. 1, 5) will change the relative position of stator core 200. Such adjustment may be made by increasing or decreasing a tension applied to first vertical wire rope member 118 by either or both attachment device 114, 116. This provides a significant advantage over known systems, where, due to the relative inflexibility of the key bars connecting the stator core to the surrounding frame structure, the frame structure must be manufactured to very strict tolerances. Very accurate alignment of stator core 200 is possible by adjusting pre-tension in one or more wire ropes of suspension system 300.

Figure 2:
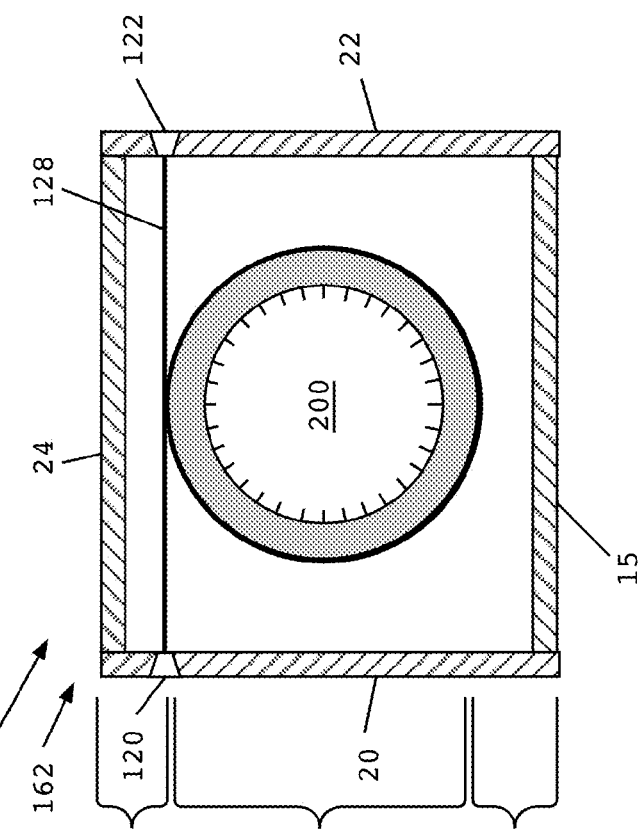

FIG. 2 shows another cross-sectional view of stator core 200 and suspension system 300. Here, stator core 200 is supported by first horizontal wire rope member 128, which is affixed to both first vertical member 20 and second vertical member 22 of a second rigid frame structure 162. Either end of first horizontal wire rope member 128 is secured to first vertical member 20 and second vertical member 22 by, respectively, first horizontal attachment device 120 and second horizontal attachment device 122. First horizontal wire rope member 128 wraps around the circumference of stator core 200, providing some support of the weight of stator core 200 but, more significantly, provides resistance to the torque induced in stator core 200 during operation while also providing vibration isolation between stator core 200 and second rigid frame structure 162.

It should be recognized that wire rope members of suspension system 300 may, in some embodiments of the invention, wrap around the circumference of the stator core more than once (e.g., once, twice, thrice, etc.). Including additional wraps of the wire rope member enables increased torque capacity, as will be recognized by one skilled in the art.

One skilled in the art will recognize that first rigid frame structure 160 (FIG. 1) and second rigid frame structure 162 (FIG. 2) may represent separate and distinct structures or may represent different portions of a single structure. For example, in some embodiments of the invention, first vertical member 10 (FIG. 1) of first rigid frame structure 160 and first vertical member 20 (FIG. 2) of second rigid frame structure 162 may represent different portions of a single wall structure.

Figure 3:
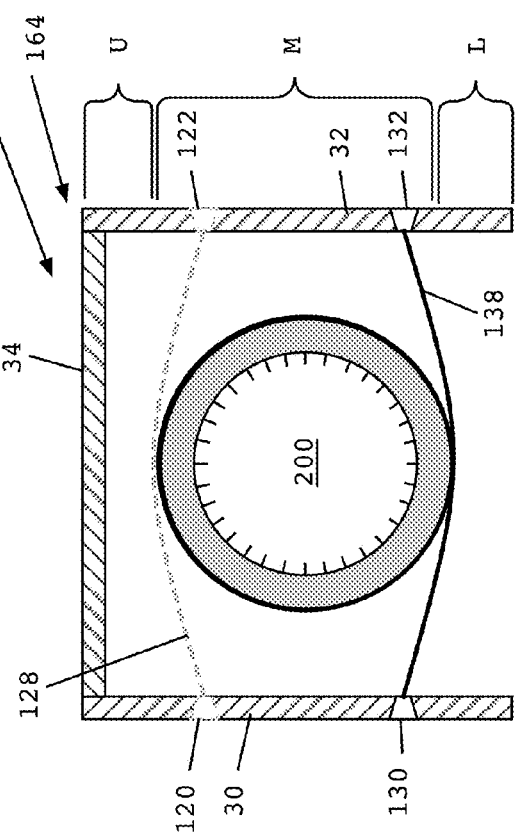

FIG. 3 shows another cross-sectional view of stator core 200 and support system 300. Here, a second horizontal wire rope member 138 extending from first vertical member 30 of third rigid support structure 164, around the circumference of stator core 200, to second vertical member 32 of third rigid support structure 164. Either end of second horizontal wire rope member 138 is affixed to first and second vertical members 30, 32 by attachment devices 130, 132, respectively. Second horizontal wire rope member 138 is affixed to first and second vertical members 30, 32 within lower portion L of third rigid frame structure 164, below stator core 200. Again, as noted above, third rigid support structure 164 may represent a structure that is separate and distinct from first and/or second rigid support structure 160, 162 (FIGS. 1, 2) or may represent a different portion of a single or common wall structure.

The attachment of second horizontal wire rope member 138 to third rigid support structure 164 at a point beneath stator core 200 will not aid in supporting the weight of stator core 200 but will both provide resistance to torque induced in stator core 200 during operation and provide vibration isolation between stator core 200 and third rigid frame structure 164.

Figure 4:
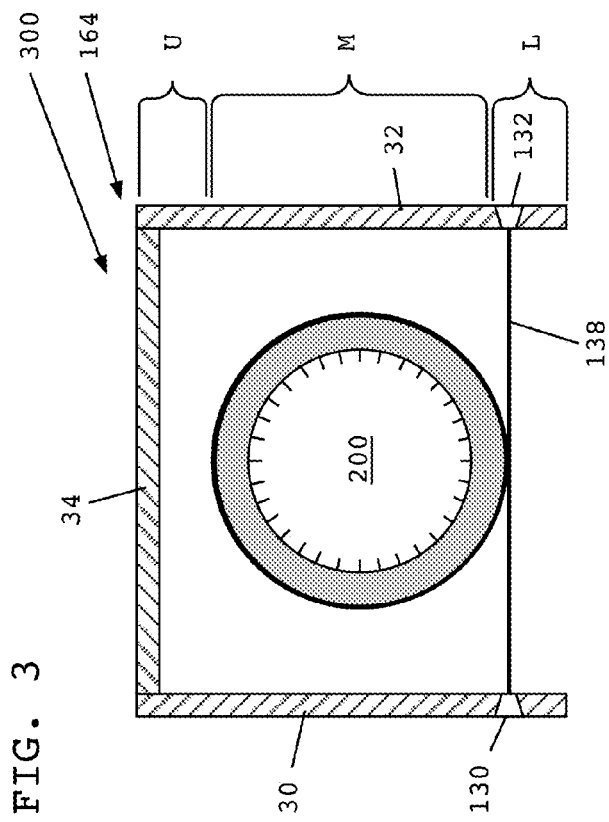

FIG. 4 shows a cross-sectional view of stator core 200 and support system 300 according to another embodiment of the invention. Here, second horizontal wire rope member 138 is attached to third rigid support structure 164 not within the lower portion L, but within the middle portion M. This will increase the support of the weight of stator core 200 provided by second horizontal wire rope member 138.

Analogously, first horizontal wire rope member 128 (shown in phantom) may be attached to second horizontal wire rope member 162 (not shown) within middle portion M rather than upper portion U, as shown in FIG. 2. This will decrease the support of the weight of stator core 200 provided by first horizontal wire rope member 128, but will continue to provide both resistance to torque induced in stator core 200 during operation and provide vibration isolation between stator core 200 and third rigid frame structure 164.

Figure 5:
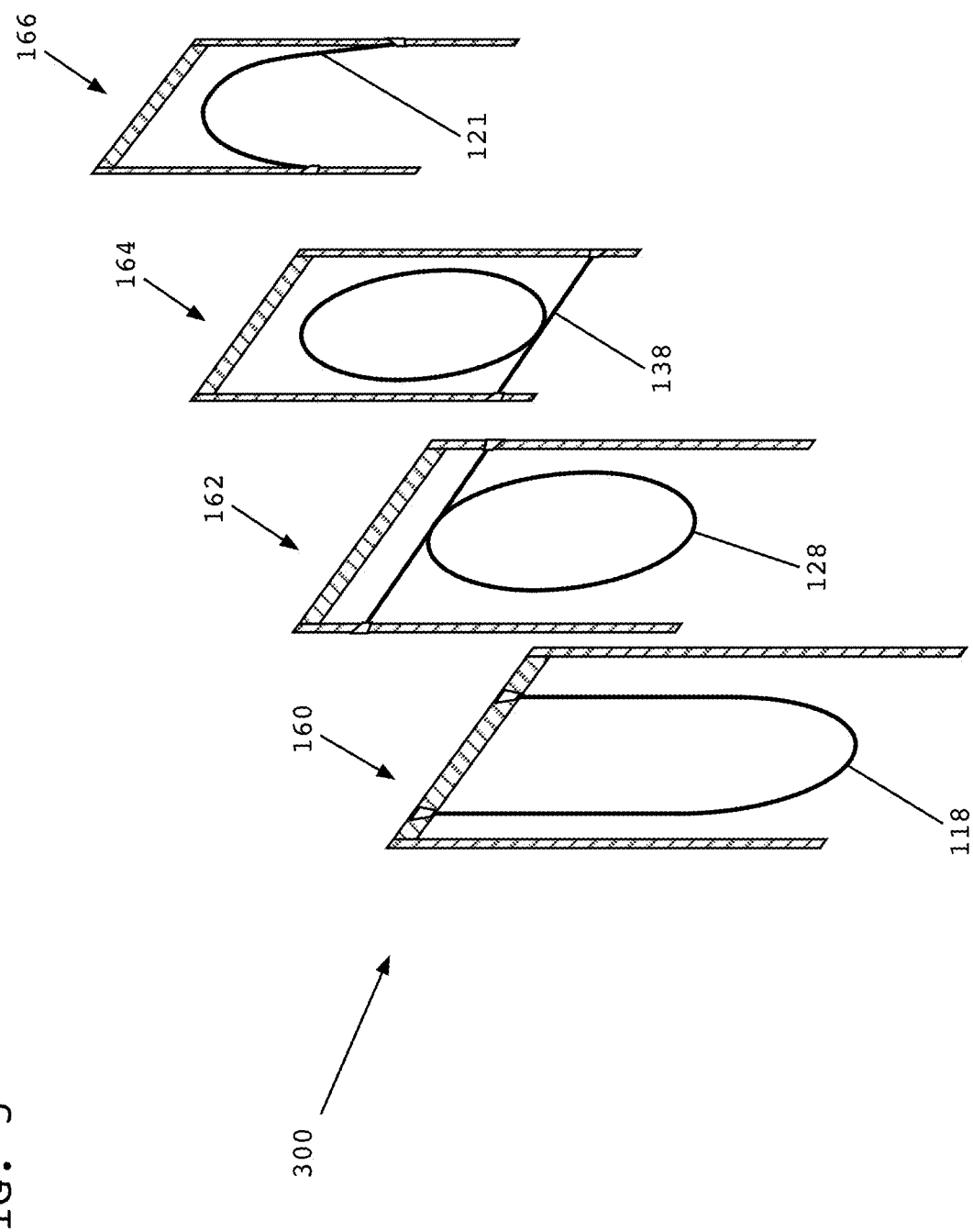
FIG. 5 shows a schematic perspective view of the portions of the suspension system of FIGS. 1-4.

FIG. 5 shows a perspective view of support system 300 without stator core, for the sake of simplicity. First, second, third, and fourth rigid support structures 160, 162, 164, 166 are shown with their respective wire rope members—first vertical wire rope member 118, first horizontal wire rope member 128, second horizontal wire rope member 138, and angled wire rope member 121. It should be recognized, of course, that support system 300 may include additional wire rope members.

For example, according to one embodiment, support system 300 includes four vertical wire rope members and five horizontal wire rope members (three horizontal wire rope members attached within the upper portion U of the rigid frame structures as with first horizontal wire rope member 128 and two horizontal wire rope members attached within lower portion L of the rigid frame structures as with second horizontal wire rope member 138). Other arrangements and combinations of wire rope members are possible, of course, as will be recognized by one skilled in the art and depending upon the particular characteristics of the electromagnetic machine.

Figure 6:
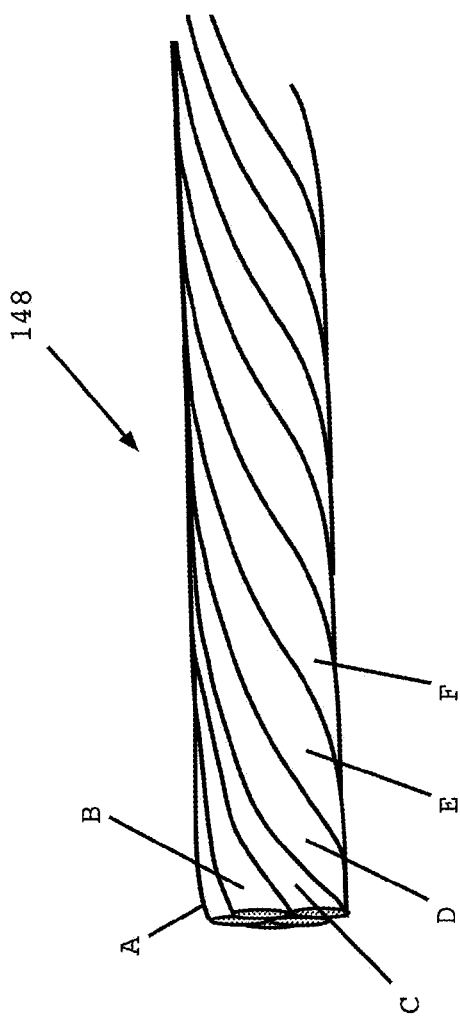
FIG. 6 shows a schematic view of a portion of a wire rope member used in some embodiments of the invention.
Figure 7:
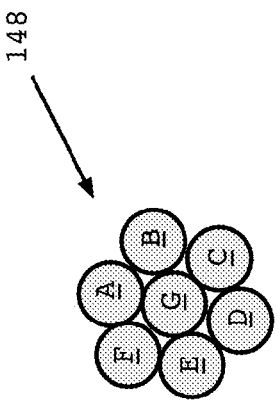

FIG. 6 shows a side view of a wire rope member 148 comprising a plurality of twisted wire strands A-F. FIG. 7 shows a radial cross-sectional view of wire rope member 148 showing wire strands A-F disposed about a central wire strand G. In some embodiments, strands A-F may include flattened rather than rounded surfaces to improve contact friction.

Figure 8:
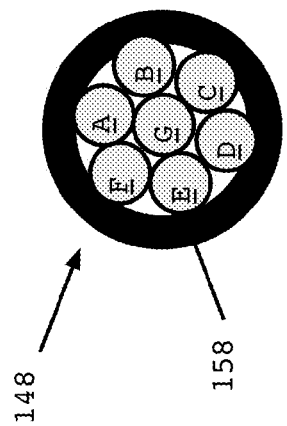
FIGS. 7-8 show schematic cross-sectional views of wire rope members used in some embodiments of the invention.

FIG. 8 shows a radial cross-sectional view of wire rope member 148 including an optional insulating layer 158. Insulating layer 158 may include any number of materials, including, for example, rubbers, vinyls, polypropylene, polyethylene, epoxies, a woven steel sleeve, etc. Insulating layer 158 reduces fretting of wire strands A-F, which might otherwise occur upon contact with other components of support system 300 or stator core 200.

Figure 9:
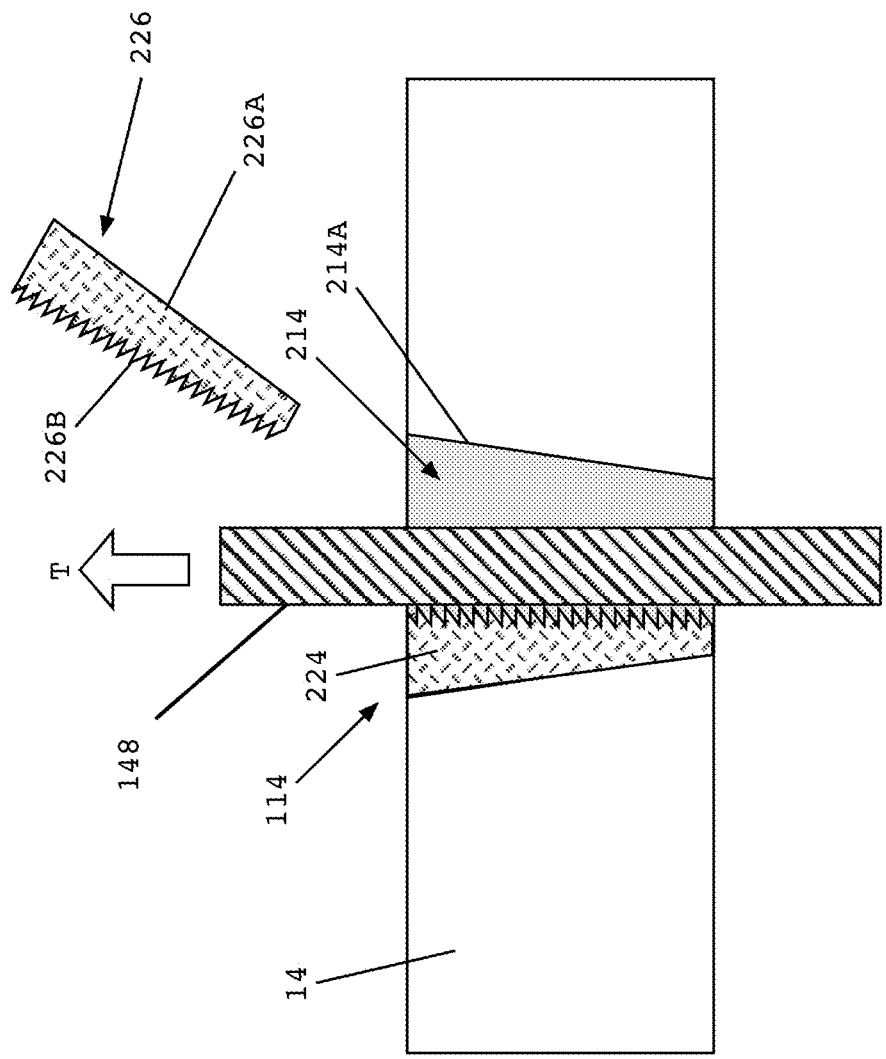
FIG. 9 shows a schematic cross-sectional view of a wire rope member and attachment device used in some embodiments of the invention.

FIG. 9 shows a detailed cross-sectional view of attachment device 114. Attachment device 114 includes a cavity 214 extending through horizontal member 14 and at least two wedge members 224, 226. In some embodiments, attachment device 114 may include three or more wedge members. For the sake of simplicity, the function of attachment device 114 will be further described with reference to a single wedge member 226. Wedge member 226 has an angled surface 226A corresponding to an angled surface 214A of cavity 214. Wedge member 226 also includes a toothed or serrated surface 226B. In operation, wire rope member 148 is passed through cavity 214 and upon application of a tensioning force T, wire rope member 148 is restrained by toothed or serrated surface 226B in a direction opposite tensioning force T. Other mechanisms for tensioning devices useful in practicing embodiments of the invention are possible, of course, as will be recognized by one skilled in the art.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of reducing vibration in a stator core of an electromagnetic machine, the method comprising:
   suspending the stator core from each of a first plurality of wire rope members attached to a horizontal member of a rigid frame structure above the stator core; and
   suspending the stator core from each of a second plurality of wire rope members attached to a vertical member of the rigid frame structure adjacent the stator core.

2. The method of claim 1, further comprising:
   positioning the stator core by adjusting a tension of at least one wire rope member of either the first plurality of wire rope members or the second plurality of wire rope members to raise or lower at least a portion of the stator core.

3. The method of claim 2, wherein positioning the stator core includes adjusting a tension of at least one wire rope member of the first plurality of wire rope members.

4. The method of claim 2, wherein positioning the stator core includes adjusting a tension of at least one wire rope member of the second plurality of wire rope members.

5. The method of claim 2, wherein positioning the stator core includes adjusting a tension of at least one wire rope member of the first plurality of wire rope members and adjusting a tension of at least one wire rope member of the second plurality of wire rope members.

6. The method of claim 1, wherein at least one wire rope member of the first plurality of wire rope members or the second plurality of wire rope members includes an attachment device for affixing an end of the at least one wire rope member to the rigid frame structure.

7. The method of claim 6, wherein the at least one wire rope member includes a first attachment device at a first end of the at least one wire rope member and a second attachment device at a second end of the at least one wire rope member.

8. The method of claim 1, wherein each of the wire rope members of the first plurality of wire rope members and the second plurality of wire rope members is selected from a group consisting of: a solid metal wire, a twisted metal wire, a braided metal wire, a polyethylene wire rope, and wire rope comprising nylon fibers.

9. The method of claim 1, wherein suspending the stator core from each of the first plurality of wire rope members includes wrapping at least one wire rope member of the first plurality of wire rope members around a circumference of the stator core at least once.

10. The method of claim 1, wherein suspending the stator core from each of the second plurality of wire rope members includes wrapping at least one wire rope member of the second plurality of wire rope members around a circumference of the stator core at least once.

* * * * *